2,790,744
Patented Apr. 30, 1957

2,790,744

AMIDE RODENT REPELLENT COMPOSITIONS

Newton H. Shearer, Jr., and Harry W. Coover, Jr., Kingsport, Tenn., assignors to Eastman Kodak Company, Rochester, N. Y., a corporation of New Jersey No Drawing. Application July 29, 1954,
Serial No. 446,641

6 Claims. (Cl. 167—46)

This invention relates to materials which are effective in repelling rodents such as mice, squirrels, beavers, porcupines and rabbits, and to compositions containing such materials. Rodent damage to stored foods in warehouses has been estimated to run as high as 20% of the total value of the stored food. The need for some material which would effectively repel rodents has been generally recognized not only by warehousemen but also by farmers, food processors and householders. The annual economic loss, due to rats and other rodents, has been estimated at between one and two billion dollars.

The Fish and Wildlife Service of the U. S. Department of the Interior has tested more than 2,700 chemicals as rodent repellents. Only a few are considered at present to have merit as rodent repellents, for example, actidione, zinc dimethyldithiocarbamate cyclohexylamine complex, tetramethylthiuram disulfide, rosin amine D and complexes of trinitrobenzene such as the aniline complex. Actidione, an antibiotic, is too expensive for commercial use and is employed only as a laboratory standard. Examples of the classes of compounds which are considered active repellents are the guanidines, the primary, secondary and tertiary amines and their salts with acetic, hydrochloric and picric acids, nitro compounds, phenols, quaternary ammonium salts and thiocyanates. Amides, acids, alcohols, ethers and nitriles have been generally ineffective.

An object of this invention is to provide new materials which are effective rodent repellents. Another objective is to provide effective rodent repellents which are more economical than the present agents.

Although amides as a class are considered to be generally ineffective as rodent repellents, we have discovered some derivatives of isobutyramide, lactamide and lactamide acetate which are exceptionally effective rodent repellents.

Three of the compounds of the present invention have index values exceeding 95 and in all cases the index values exceed 85. The compounds of the present invention may be readily prepared by the usual methods for making substituted amides, for example, of the reaction of nitriles with secondary or tertiary alcohols or alkenes in the presence of sulfuric acid or by the reaction of acid chlorides with amines or by the aminolysis of esters using amines, etc.

The compounds of the present invention may be classified as N-monosubstituted isobutyramides, N-monosubstituted lactamides and N-monosubstituted lactamide acetates.

Evaluation of the rodent repellent activity of these compounds was carried out by use of a food acceptance technic which is described in the following publication: Rodent Repellent Studies, I, Development of an Index Number for Expressing Degrees of Repellent Activity, E. Bellach, J. B. De Witt, J. Am. Pharm. Soc. (Sci. Ed.), 38 (2) 109–112 (1949). According to this technic, healthy young rats are used, together with a normal rat food, which may be a standard laboratory diet for rats, which is adequate for normal growth and reproduction. The food was ground to pass a 10-mesh standard screen, and the treated food generally contained 2% by weight of the sample being tested, well mixed with the food. The following procedure is quoted from page 110 of the above article:

"Each experimental group consisted of three or more rats, housed in individual cages, and furnished water ad libitum. The rats had been maintained on the untreated experimental diets for a period of at least one week prior to the start of the test. At the beginning of the test, each animal was provided with a suitable food cup containing 20 gm. of the untreated food, and a similar cup containing 20 gm. of the treated food. No other food was available to the rats during the test period. The amount of food remaining in the cups was weighed each twenty-four hours during the four-day experimental period, and the cups returned to the cages. The animals, and any residual food, were discarded at the end of the experiment."

By a formula explained in the above article, a repellency index is calculated for any given material under test.

An index number greater than 85 is indicative of repellent activity and 100 is the highest possible index number. The materials described in this invention were tested at a 2% concentration in the food.

Example I.—Isobutyramides

The bioassay procedure involving a food acceptance technic referred to above was used to obtain the following index numbers for the indicated isobutyramides: N-1,1,3,3-tetramethylbutylisobutyramide, 99.2; N-cyclohexylisobutyramide, 97.1; N-isopropylisobutyramide, 87.7; N-t-butylisobutyramide, 88.7.

Example II.—Lactamides

The procedure of Example I was used to obtain the following index numbers for the indicated lactamides: N-isobornyl lactamide 96.1, N-t-butyl lactamide 91.7.

Example III.—Lactamide acetates

The procedure of Example I was used to obtain an index number of 88.6 for N-t-butyl lactamide acetate, that is,

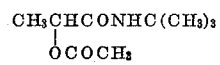

Examples of foods in which the repellents of the invention are effective are: a standard laboratory diet for rats or such foods as wheat, rice, corn, barley, grass seeds, etc.

The following data relates to the preparation of the compounds found to be rodent repellents according to the invention: The Plaut and Ritter, J. A. C. S., 73, 4076 (1951) article describes the synthesis of lactamides from lactonitrile using alcohols or olefins in an acidic medium. All the compounds of this invention can be conveniently prepared following the methods described in this article.

We claim:

1. A food normally eaten by rodents and containing a rodent repelling quantity of a compound selected from the group consisting of N-1,1,3,3-tetramethylbutylisobutyramide, N-cyclohexylisobutyramide, N-tert-butylisobutyramide, N-isopropylisobutyramide, N-isobornyllactamide, N-tert-butyllactamide, and N-tert-butyllactamide acetate.

2. A food normally eaten by rodents and containing a rodent repelling quantity of N-1,1,3,3-tetramethylbutylisobutyramide.

3. A food normally eaten by rodents and containing a rodent repelling quantity of N-cyclohexylisobutyramide.

4. A food normally eaten by rodents and containing a rodent repelling quantity of N-t-butylisobutyramide.

5. A food normally eaten by rodents and containing a rodent repelling quantity of N-isobornyl lactamide.

6. A food normally eaten by rodents and containing a rodent repelling quantity of N-t-butyl lactamide.

References Cited in the file of this patent

Chemical-Biological Coordination Center Review, No. 5, published May 8, 1953, by National Research Council, Washington, D. C., pp. 65–67.